Figure 1:
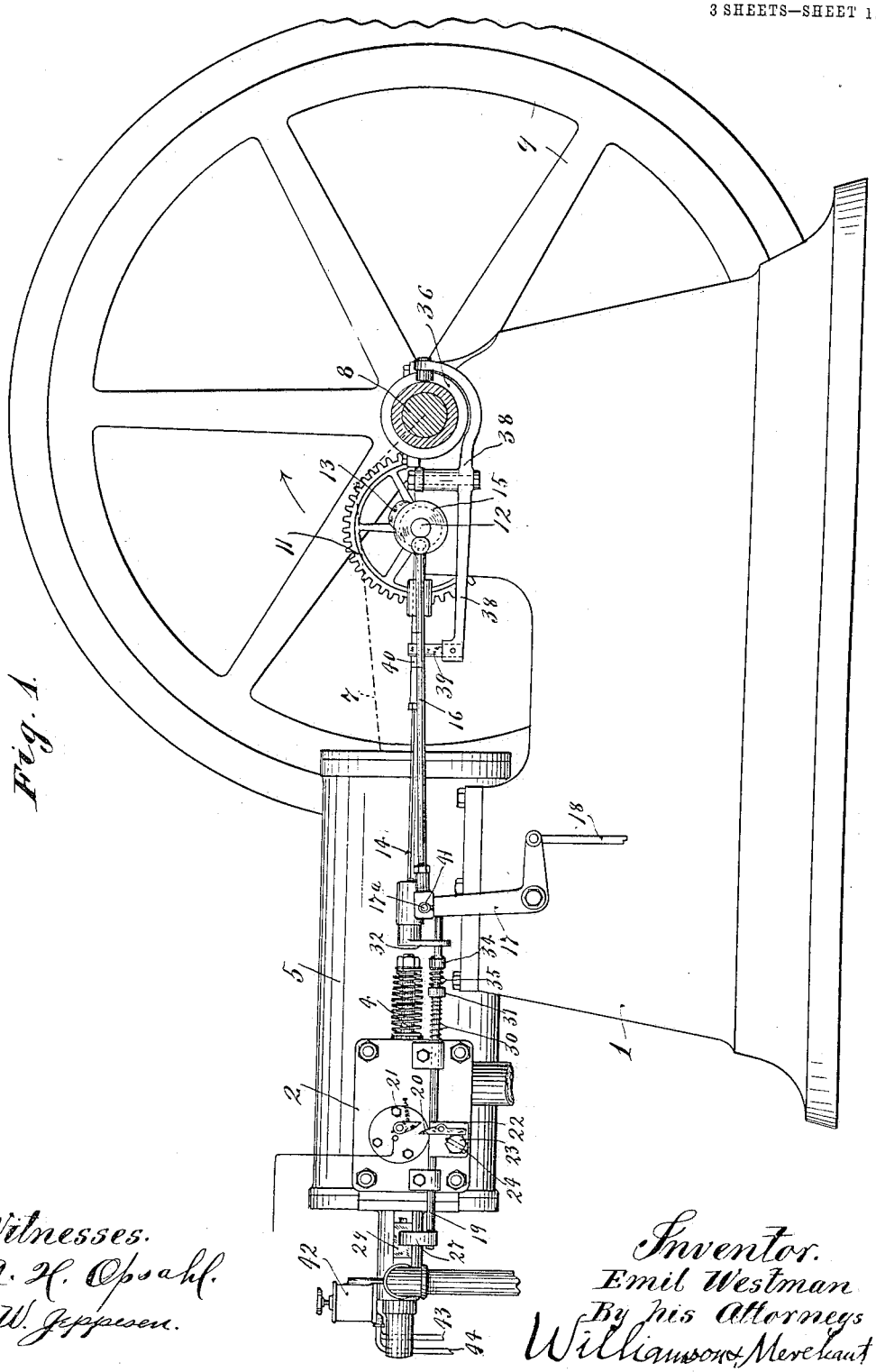

No. 787,417. PATENTED APR. 18, 1905.
E. WESTMAN.
GOVERNING DEVICE FOR VALVE AND IGNITER GEAR FOR EXPLOSIVE ENGINES.
APPLICATION FILED APR. 18, 1904.

3 SHEETS—SHEET 1.

Witnesses.
A. H. Opsahl.
E. W. Jeppesen.

Inventor.
Emil Westman
By his Attorneys
Williamson & Merchant

No. 787,417. PATENTED APR. 18, 1905.
E. WESTMAN.
GOVERNING DEVICE FOR VALVE AND IGNITER GEAR FOR EXPLOSIVE ENGINES.
APPLICATION FILED APR. 18, 1904.
3 SHEETS—SHEET 2.
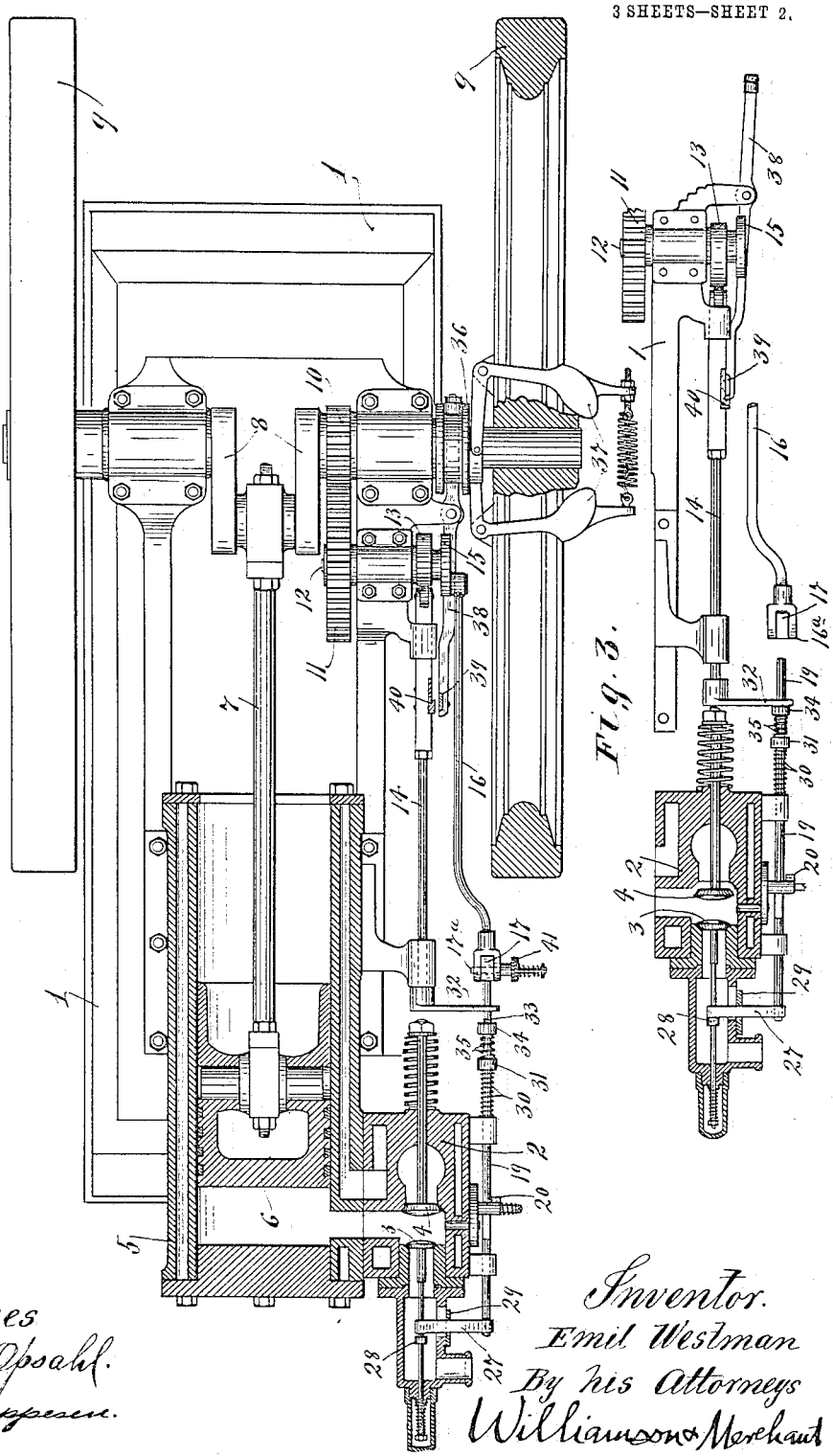
Witnesses
A. H. Opsahl.
E. W. Jeppesen.
Inventor.
Emil Westman
By his Attorneys
Williamson & Merchant

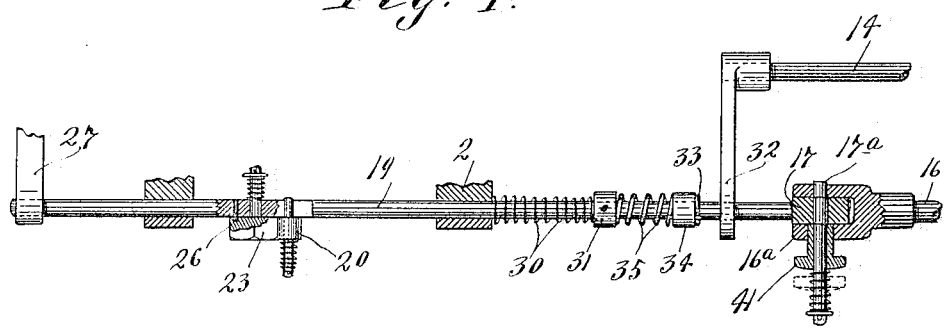
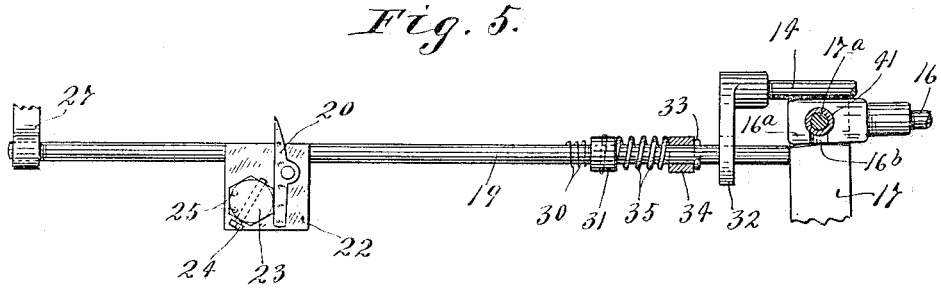
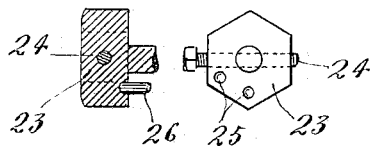
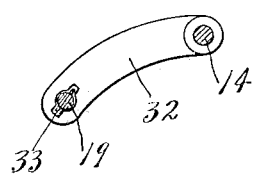
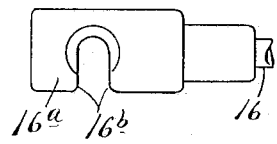

No. 787,417.

Patented April 18, 1905.

UNITED STATES PATENT OFFICE.

EMIL WESTMAN, OF MINNEAPOLIS, MINNESOTA, ASSIGNOR TO THE ENTERPRISE MACHINE COMPANY, OF MINNEAPOLIS, MINNESOTA, A COPARTNERSHIP.

GOVERNING DEVICE FOR VALVE AND IGNITER GEAR FOR EXPLOSIVE-ENGINES.

SPECIFICATION forming part of Letters Patent No. 787,417, dated April 18, 1905.

Application filed April 18, 1904. Serial No. 203,579.

*To all whom it may concern:*

Be it known that I, EMIL WESTMAN, a citizen of the United States, residing at Minneapolis, in the county of Hennepin and State of Minnesota, have invented certain new and useful Improvements in Governing Devices for Valve and Igniter Gears for Explosive-Engines; and I do hereby declare the following to be a full, clear, and exact description of the invention, such as will enable others skilled in the art to which it appertains to make and use the same.

My invention relates to explosive-engines, and has for its object to provide certain improvements in the governing devices for the valve and igniter gears.

To this end my invention consists of the novel devices and combinations of devices hereinafter described, and defined in the claims.

The invention is illustrated in the accompanying drawings, wherein like notations refer to like parts throughout the several views.

In the said drawings, Figure 1 is a view, chiefly in side elevation, with some parts shown in section, some broken away, and others removed, illustrating my improvements as applied to an ordinary four-cycle engine of the stationary horizontal type. Fig. 2 is a view of the same parts, chiefly in horizontal section, with some parts broken away and others removed. Fig. 3 is a detail showing some of the parts in the same plane as in Fig. 2, but in a different position. Figs. 4 and 5 are details showing the relations of some of the parts of the valve and igniter gears detached. Fig. 6 is a detail of the igniter-trip. Fig. 7 is a detail of one of the parts shown in Figs. 4 and 5, and Fig. 8 is a detail of another of the parts shown in Figs. 4 and 5.

The engine being of the well-known four-cycle type, any extended detail description thereof is not deemed necessary beyond noting the parts to which my improvements apply.

The numeral 1 indicates the base or bed casting, 2 the valve-chest, with spring-seated admission-valve 3 and spring-seated exhaust-valve 4, 5 the cylinder-casting, 6 the piston, 7 the connecting-rod, 8 the crank-shaft, and 9 the fly-wheels, all occupying their customary relations. On the crank-shaft 8 is a small gear 10, in mesh with larger gear 11 on the counter or gear shaft 12 to afford the speed relation of two to one in the usual way. On the gear-shaft 12 is the usual exhaust-valve opening-cam 13, coöperating with the thrust-rod 14, mounted in suitable guides fixed to the engine-casting for securing the desired action on the projecting stem of the spring-seated exhaust-valve 4. On the gear-shaft 12 is also a crank-disk 15, connected by rod 16 with a bell-crank rocker 17, which serves to operate the gasolene-pump rod 18 and normally to operate the igniter trip-rod 19. The igniter trip-rod 19 is mounted in suitable guides fixed to the engine-castings and carries a spring-held pivoted trip 20 for coöperation with the spring-held or movable member 21 of the electrodes. The said spring-held trip 20 is pivoted to a block 22, fixed on the rod 19 and having mounted therein an adjusting device in the form of a spring-seated bolt 23, with a set-screw 24 working diametrically through its head. The head of said bolt 23 has recesses 25 for engagement with studs 26, fixed in the rod 19 to hold the bolt 23 in any position in which it may be set, as best shown in Figs. 4 and 5. The said adjusting device would take the position shown in Fig. 5 when the igniter is to be set for starting, and after the engine is under way the bolt 23 would be turned so as to make the set-screw 24 the backstop for the trip 20. The said set-screw 24 may be adjusted to make the tripping action, and hence the time of ignition, occur earlier or later, as desired.

The trip-rod 19 is provided on its outer end with an inwardly-extending arm 27, which works through a slot provided therefor in the casing of the admission-valve 3 and comes into position for action on a collar 28, fixed to the stem of said valve for holding the valve in its closed position, as will presently more fully appear. The said arm 27 has fixed thereto a small plate 29, which serves as a cover to the slot in the valve-casing, through which the said arm passes. Said trip-rod 19 is subject to a spring 30, reacting between one of the rod-guides and a collar 31, fixed to the rod, and tending to throw the said rod to its rearmost position for coöperation with the rocker 17. The thrust-rod 14 is provided on its outer end with an arm 32, projecting outward and perforated and slotted, as best shown in Fig. 7, to pass over or ride on the trip-rod 19 and permit a stop-pin 33, fixed to said rod 19, to pass through the slotted opening in the said arm 32. On the trip-rod 19 is a loose collar 34, between which and the fixed collar 31 reacts a spring 35, which is stronger than the spring 30. The purpose of this relation of the said parts will presently more fully appear in tracing the action under the control of the governor.

The centrifugal governor is of the customary form and mounting, with sliding grooved collar or sleeve 36 mounted on the engine-shaft and subject to the spring-held weighted levers 37 for the customary actions. The said collar 36 is engaged by the rear or shipper end of a latch-lever 38, pivoted to a suitable bearing fixed to the engine-castings and having at its outer end an upwardly-projecting knife-edged latch-arm 39, adapted to engage behind a shouldered latch-block 40, fixed to the thrust-rod 14.

With this described relation of the parts the action is as follows: When the engine is running below or not above its normal speed, the thrust-rod 14 becomes subject to the cam 13 for opening the exhaust-valve to effect the exhaust from the engine at the proper times, and the igniter-rod 19 becomes subject to the crank-actuated rocker 17 for operating the igniter at the proper times to afford the explosions; but if the engine runs up to a speed beyond its normal limit then under the action of the governor the free end of the latch-lever 38 will be thrown inward, so as to cause its latch-arm 39 to engage behind the latch-block 40 on the thrust-rod 14 at the time when the latter has been forced outward to its limit by the cam 13, and thereby the said thrust-rod 14 and governor-controlled lever 38 will hold the exhaust-valve 4 in its open position and at the same time, through the arm 32 acting on the loose collar 34 and the spring 35 reacting against the fixed collar 31 on the trip-rod 19, the said thrust-rod 14 will yieldingly force the trip-rod 19 into its outermost position and cause its arm 27, acting on the collar 28 of the admission-valve 3, to yieldingly hold the said valve in its closed position, and at the same time the igniter will be held in its idle position or with the trip 20 held at a point beyond the movable electrode 21 and the inner end of the rod beyond the range of action or throw of the rocker 17. Under the action of the crank 15 the rocker 17 engages the end of the trip-rod 19 and imparts an initial movement thereof toward the left, which initial movement carries the igniter-trip 20 into engagement with the igniter-arm 21 and then past the same, thereby producing the spark and exploding the charge. This movement of the trip-rod 19 compresses only the relatively weak spring 30. While the trip-rod 19 is thus forced toward the left with its igniter-trip 20 at the left of the igniter-arm 21, the cam 13 forces the thrust-rod 14 toward the left, thereby causing the same to force the exhaust-valve into an open position and at the same time causing the arm 32 by its engagement with the spring-pressed loose collar 34 to impart a secondary movement of the trip-rod 19 toward the left and by compression of the spring 35 forces the said admission-valve against its seat under greatly-increased pressure, as shown in Fig. 3. The trip-rod 19 and parts carried thereby are restored to their normal positions by the spring 30. It will thus be seen that the trip-rod 19 is given an initial or first step of movement by one engine-driven part and that by another engine-driven part the exhaust-valve is pushed open and the admission-valve is closed under increased strain under a secondary movement of said trip-rod. This position of the said parts will remain until the engine falls back to its normal speed or below the same, whereupon the governor-actuated lever 38 will be unlatched or released from the thrust-rod 14, whereupon all the parts will be instantly brought back to their spring-held normal positions and so remain until the engine again reaches a speed higher than normal, whereupon the same action as before is repeated. Fig. 2 shows the parts in the positions which they occupy when the engine is running not above its normal speed, and Fig. 3 shows the position of the parts as they appear when the engine is running above its normal speed, or, in other words, when under the control of the governor the thrust-rod 14 and the igniter trip-rod 19 are holding the exhaust-valve in its open position, the admission-valve in its closed position, and the igniter in its idle position.

By actual practice I have demonstrated the efficiency of these improved governing devices for the valve and igniter gears of an explosive-engine and have found that the same are not only reliable, but are sensitive, enabling the engine to be run at a very steady motion for any desired predetermined load, and also that considerable economy of gasolene is effected, for the reason that none thereof can be drawn through the admission-valve seat under the suction of the piston on its governor-controlled idle stroke. For its best action the admission-valve 3 cannot be made subject to a very strong retracting or seating spring. Otherwise stated, the spring of the admission-valve must be such that said valve will open under the suction-stroke of the piston when the exhaust-valve is closed. Under these conditions it has been found that the admission-valve will open or leak more or less under the idle stroke of the piston unless the seating-spring for the admission-valve is reinforced by some additional means to hold the said valve in its closed position when the idle stroke is desired. My means for the purpose does the work and is simple and reliable, as above noted. It is also an advantage to have the igniter in an idle position at the time of the idle stroke of the piston, as there is a corresponding saving in the wear and tear on the electrodes and in the electromotive force required.

By reference to Figs. 4, 5, and 8 it may be seen that the rocker 17 has fixed to its upper end a pin 17ª and that the crank-rod 16 terminates at its outer end in a bifurcated head, affording a pair of jaws 16ª with slotted seats 16ᵇ, adapted to engage with the projecting ends of the rocker-pin 17ª. The slot or pin-seat in one of the jaws is enlarged at its upper end to receive a locking-plug 41, which is spring-seated on the adjacent projecting end of said pin and is of larger diameter than the mouths of the slots 16ᵇ. It follows from this construction that when the parts are coupled and the locking-plug 41 is in its innermost or spring-held position the coupled parts will be locked together, but that they may be readily separated or uncoupled by simply pulling outward the spring-seated locking-plug 41, whereupon the crank-rod may be lifted off from the rocker-pin. This is a detail of convenience for assembling, inspecting, and repairing parts of the engine whenever so desired, but especially for operating the pump-rocker 17 by hand.

It may be noted that the gasolene is supplied to the casing of the admission-valve 3 or the air-pipe leading thereto by a feed-cup 42 with circulating connections 43 44, which lead, respectively, from the gasolene-pump and back to the gasolene-reservoir. (Not shown.) The cup 42 is kept full of gasolene through these connections under the action of the pump, (not shown,) which is operated from the gear crank-disk 15 through the rod 16, rocker 17, and rod 18, as hitherto described. The separable coupling connecting the rod 16 and the rocker 17 permits the latter to be manipulated by hand whenever so desired for filling the gasolene-cup 42 when the engine is idle, as for starting purposes. The said gasolene-feed cup 42, with its circulating connections, operates on the same principle as the feed-cup disclosed in my prior patent, No. 681,382, of August 27, 1901.

The adjustable trip 20 on the igniter-rod can be variably set without stopping the engine, which is a great convenience in order to secure the desired point of ignition after the engine is started.

What I claim, and desire to secure by Letters Patent of the United States, is as follows:

1. In an explosive-engine, the combination with admission and exhaust valves and an igniter, of a gear for operating the same comprising a reciprocating trip-rod, having means for actuating said igniter and for holding said admission-valve closed, and a pair of engine-driven parts, the one operating on said trip-rod to impart an initial igniter-actuating movement thereto, and the other operating on said exhaust-valve, to open the same, and operating on said trip-rod to impart a secondary movement thereto, such secondary movement of said trip-rod serving to press said admission-valve to its seat under increased strain, while said exhaust-valve is open, substantially as described.

2. In an explosive-engine, the combination with admission and exhaust valves and an igniter, of a gear for operating the same, comprising a reciprocating trip-rod, having means for actuating said igniter and for holding said admission-valve closed, a pair of engine-driven parts, the one operating on said trip-rod to impart an initial igniter-actuating movement thereto, and the other operating on said exhaust-valve, to open the same, and operating on said trip to impart a secondary movement thereto, which secondary movement serves to press said admission-valve to its seat under increased strain, while said exhaust-valve is open, and a governor-controlled latch operative on said latter-noted engine-driven part to hold said exhaust-valve open, to hold said admission-valve seated, and to throw the igniter out of action, when the engine is running above a normal speed, substantially as described.

3. In an explosive-engine, the combination with admission and exhaust valves and an electric igniter, of a gear for operating the same, comprising a reciprocating trip-rod having means for actuating said igniter and for holding said admission-valve closed, an engine-driven cam and an engine-driven crank, a rocker operative on said trip-rod, to impart an initial igniter-actuating movement thereto, a rod connecting said rocker to said crank, a fixed and a loose collar on said trip-rod, a relatively weak spring between said fixed collar and a base of reaction, a relatively strong spring between said fixed and loose collars, and a thrust-rod subject to said cam, operative to open said exhaust-valve, and having a part engageable with said loose collar, to impart a secondary movement to said trip-rod, substantially as described.

4. In an explosive-engine, the combination with admission and exhaust valves and an electric igniter, of a gear for operating the same, comprising a reciprocating trip-rod having means for actuating said igniter and for holding said admission-valve closed, an engine-driven cam and an engine-driven crank, a crank-driven rocker operative on said trip-rod to impart an initial igniter-actuating movement thereto, a fixed and loose collar on said trip-rod, a relatively weak spring between said fixed collar and a base of reaction, a relatively strong spring between said fixed and loose collars, a cam-actuated thrust-rod operative to open said exhaust-valve and having a part engageable with said loose collar, to impart a secondary movement to said trip-rod and a governor-actuated latch operative on said thrust-rod to lock the same in position to hold said exhaust-valve open, to throw said igniter out of action, and to hold said admission-valve closed, substantially as described.

In testimony whereof I affix my signature in presence of two witnesses.

EMIL WESTMAN.

Witnesses:
 JAS. F. WILLIAMS,
 F. D. MERCHANT.